(12) United States Patent
Sulcs et al.

(10) Patent No.: US 6,857,926 B1
(45) Date of Patent: Feb. 22, 2005

(54) METHOD OF MAKING ARC TUBES

(75) Inventors: Juris Sulcs, Chagrin Falls, OH (US); Abbas Lamouri, Fairview Park, OH (US)

(73) Assignee: Advanced Lighting Technologies, Inc., Solon, OH (US)

( * ) Notice: Subject to any disclaimer, the term of this patent is extended or adjusted under 35 U.S.C. 154(b) by 271 days.

(21) Appl. No.: 09/597,549

(22) Filed: Jun. 19, 2000

(51) Int. Cl.⁷ .............................. H01J 9/00; H01J 9/24
(52) U.S. Cl. ............................ 445/26; 445/22; 445/43; 313/634
(58) Field of Search .............................. 445/22, 26, 43; 313/634

(56) References Cited

U.S. PATENT DOCUMENTS

| | | |
|---|---|---|
| 3,504,819 A | 4/1970 | Veres |
| 3,858,078 A | 12/1974 | Koury |
| 3,885,181 A | 5/1975 | Nelson et al. |
| 4,001,623 A | 1/1977 | Howles et al. |
| 4,056,751 A | 11/1977 | Gungle et al. |
| 4,232,243 A | 11/1980 | Rigden |
| 4,498,027 A | 2/1985 | Karlotski et al. |
| 4,850,499 A | 7/1989 | White et al. |
| 4,891,555 A | * 1/1990 | Ahlgren et al. ............. 313/634 |
| 5,016,150 A | 5/1991 | Gordin et al. |
| 5,055,740 A | 10/1991 | Sulcs |
| 5,138,227 A | * 8/1992 | Heider et al. ............... 313/623 |
| 5,525,863 A | 6/1996 | Kowalczyk et al. |
| 5,539,271 A | 7/1996 | Sulcs et al. |

* cited by examiner

*Primary Examiner*—Nimeshkumar D. Patel
*Assistant Examiner*—Mariceli Santiago
(74) *Attorney, Agent, or Firm*—Duane Morris LLP

(57) ABSTRACT

The present invention is directed to methods of making arc tubes for high intensity discharge lamps. The bottom portion of the light emitting chamber of the arc tubes is flattened in an area between the electrodes to reduce the distance between the bottom wall of the arc tube and the arc, and to increase the surface area of the pool of condensed halides during operation of a metal halide lamp. The flattened bottom of the arc tubes may be generally planar, slightly arcuate longitudinally and/or transversely, or slightly v-shaped longitudinally and/or transversely. The top portion of the arc tube conforms generally to the shape of the arc during operation of the lamp.

40 Claims, 6 Drawing Sheets

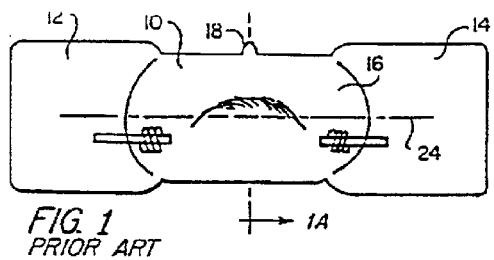
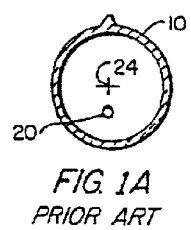
FIG. 1
PRIOR ART
FIG. 1A
PRIOR ART
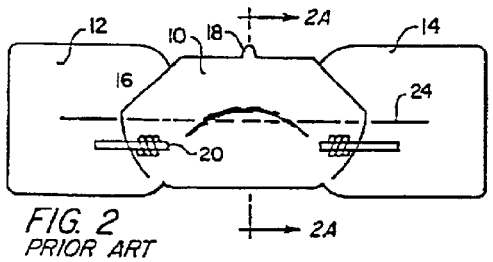
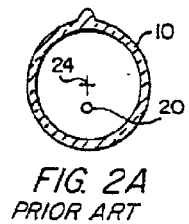
FIG. 2
PRIOR ART
FIG. 2A
PRIOR ART
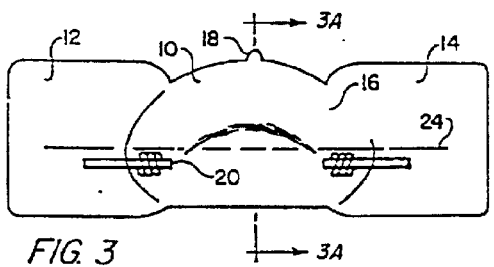
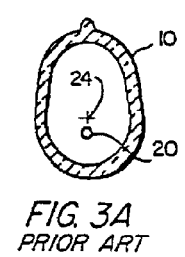
FIG. 3
PRIOR ART
FIG. 3A
PRIOR ART
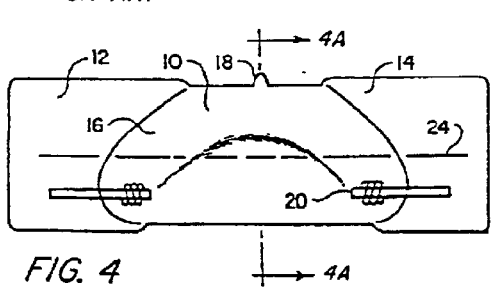
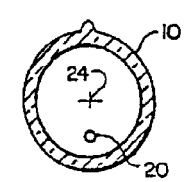
FIG. 4
PRIOR ART
FIG. 4A
PRIOR ART
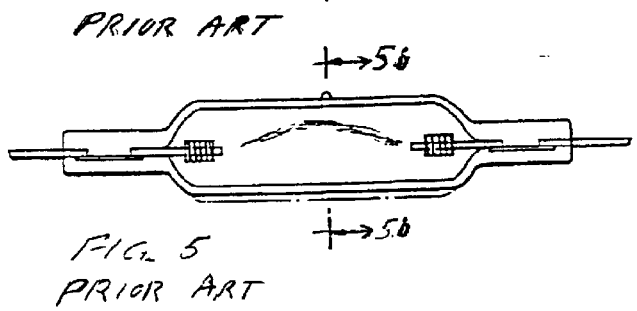
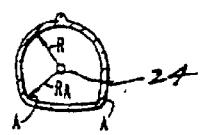
FIG. 5
PRIOR ART
FIG. 5A
PRIOR ART
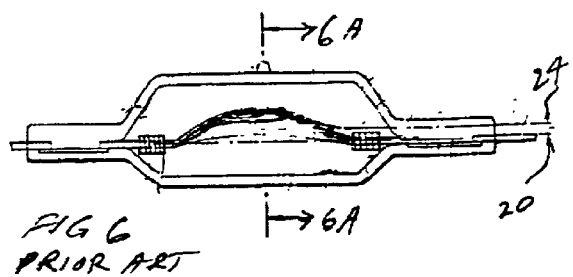
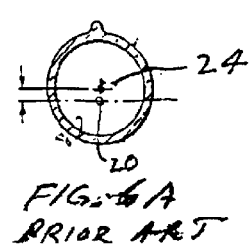
FIG. 6
PRIOR ART
FIG. 6A
PRIOR ART

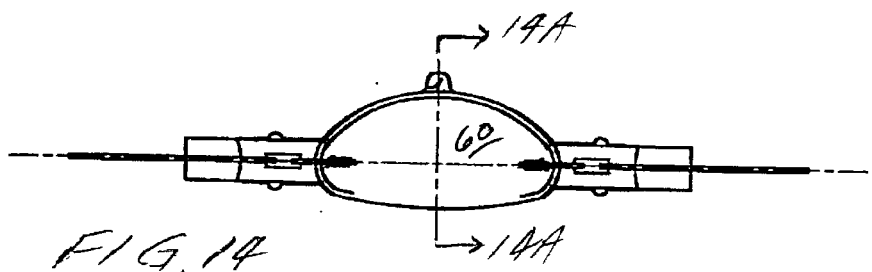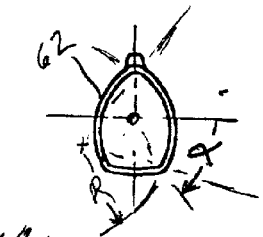
FIG.14 FIG.14A
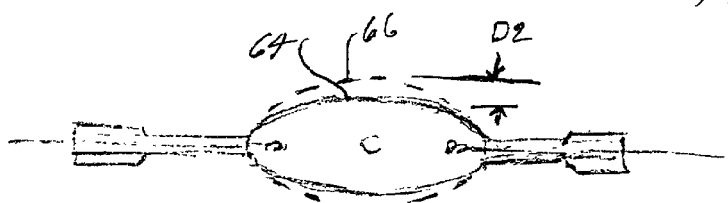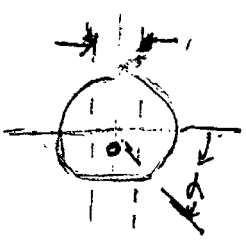
FIG.17 FIG.18
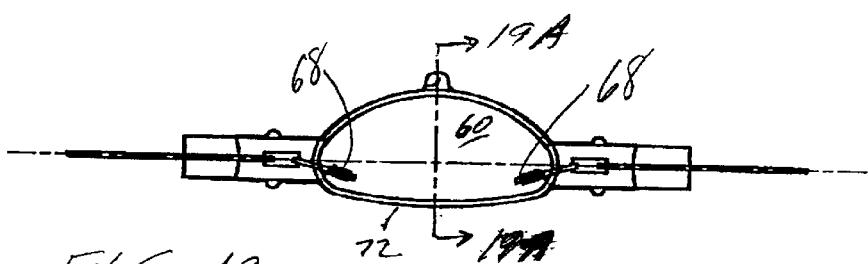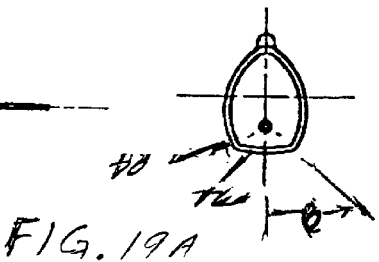
FIG.19 FIG.19A
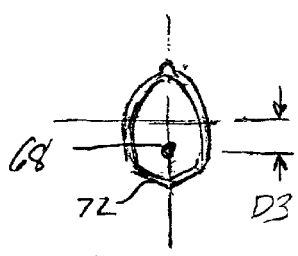
FIG.20 FIG.21

METHOD OF MAKING ARC TUBES

BACKGROUND OF THE INVENTION

This invention relates generally to horizontally burning high intensity discharge ("HID") lamps with a vaporizable lamp fill material, and to an arc tube therefor.

HID lamps with a vaporizable lamp fill material such as metal halide and ultra high performance mercury lamps have been developed as a point source. Many HID lamps with a vaporizable fill material have found widespread use in outdoor and indoor applications. In many applications, metal halide lamps have been favored because of their higher efficiency in producing white light. However, most arc discharge lamps for general lighting applications are universal, i.e., they are designed to operate in any orientation. When the burning position of a conventional arc discharge lamp is changed from the vertical to the horizontal position, a dramatic shift in light output and color temperature generally occurs.

For example, metal halide lamps designed to operate only in a horizontal position are well known. When a metal halide lamp is operated in the horizontal position, the arc discharge is not coaxial with the horizontally disposed electrodes but tends to bow upwards because of convection currents within the arc tube. The bowing of the arc heats up the upper part of the arc tube and creates a cold spot along the bottom where the halides condense. The resulting large difference in temperature between the upper and lower parts of the arc tube creates performance problems. Depending on the temperature of the cold spot, the halides may condense in such a manner that the surface area of the halide pool is significantly reduced and the vapor pressure of the halides in the arc tube is decreased correspondingly, degrading the light output and the quality of color. In addition, the upper portion of the arc tube may overheat resulting in possible devetrification and increased halide reaction with silica. Thus, the life and efficiency of the lamp are compromised.

The prior art has repeatedly tried to obviate the difficulties which result from the bow in the arc and the resultant difference in temperature between the upper and lower portions of the arc tube. For example, the Koury U.S. Pat. No. 3,858,078 dated Dec. 1, 1974 and the Karlotski U.S. Pat. No. 4,498,027 dated Feb. 5, 1985 disclose the use of an arched arc tube so that the arched shape of the arc tube conforms generally to the bow in the arc during normal operation. However, such arched arc tubes generally have a low spot behind the electrodes and away from the arc, thus creating an undesirable cold spot where the halides condense into a pool having a relatively small surface area.

It is know to locate the electrodes slightly below the curved axis of such arched arc tubes in an effort to heat the end cavity of the arc tube as disclosed., e.g., in the Gungle U.S. Pat. No. 4,056,751 dated Nov. 1, 1977. This adds complexity in the manufacture of the arc tubes but has not obviated the problem of halide condensation behind the electrodes and increased the cost of manufacturing.

Others have attempted to increase the distance from the arc to the top of the arc tube and to increase the temperature of the lower portion of the arc tube by lowering the electrodes relative to the axis of the arc tube without arching the arc tube. As shown in FIGS. 1, 2 and 6, a cylindrical arc tube body 10 may be pinched on the ends 12, 14 and the axis of the electrodes 20 lowered below the axis 24 of the arc tube body. As illustrated in FIG. 3, the cross-sectional shape of the upper portion of the arc tube between the free ends of the electrodes may be modified to increase the distance from the top wall from the arc relative to the side walls. The Rigden U.S. Pat. No. 4,232,243 dated November, 1980, the Howles U.S. Pat. No. 4,001,623 dated Jan. 4, 1977, and the Kowalczyk U.S. Pat. No. 5,525,863 dated Jun. 11, 1996 are exemplary of such efforts.

However, this approach has not solved the problem of cold spots below and behind the electrodes where the halides will condense, and the location of the electrodes below the longitudinal axis of a generally symmetrical arc tube will create wide and unacceptable variations in color quality as the size and location of the surface area of the halide pool changes when the burning position is tilted slightly from the horizontal in the installation of the lamp into a fixture.

More recently, a successful approach is described in the Sulcs U.S. Pat. No. 5,055,740 dated October 8, 1991 assigned to the assignee of the present invention. In this approach, and as shown in FIG. 4, the electrodes 20 are located below the central axis 24 of a cylindrical arc tube which is asymmetrically pinched at 12, 14 to shape the tube at both ends and to move the halide pool toward the central portion thereof. This solves the problem of the overheating of the upper portion of the arc tube and the variation in color with the tilting of the lamp because only the upper portion of the arc tube is arched by the asymmetrical pinch. However, even here, the amount of surface area of the halide condensate is less than desirable and the arc tube wall below and around the electrodes tends to overheat because of proximity to the electrodes.

Attempts have been made to flatten the bottom portion of a cylindrical arc tube to move it closer to the arc and thereby reduce the temperature differential between the top and bottom portions of the arc tube. Such an arc tube is disclosed in the Gordin et al U.S. Pat. No. 5,0016,150 dated May 14, 1991. However, and as explained in greater detail in the aforementioned Kowalczyk U.S. Pat. No. 5,525,863 and as illustrated in FIG. 5, the flattening of the lower wall does not address the overheating of the upper wall and results in longitudinal zones of irregular curvature where the distance RA from the axis of the electrodes 20 is greater than the distance R from the electrode axis to the top and side walls of the arc tube.

Still others have attempted to address the cold spot problem by coating the ends of arc tubes with an infrared reflective coating to raise the temperature of the cold spots behind the electrodes. However, such coatings do not address the cold spot problem at the bottom of a horizontal burning arc tube.

It is accordingly an object of the present invention to obviate many of the problems associated with horizontal burning arc discharge lamps and to provide a novel horizontal burning HID lamp, arc tube and method of arc tube construction.

It is another object of the present invention to provide a novel horizontally burning arc discharge lamp and method with more uniform temperature distribution over the wall of the arc tube.

It is still another object of the present invention to provide a novel horizontally burning arc discharge lamp and method with an increased condensate surface area.

It is yet another object of the present invention to provide a novel horizontally burning arc tube and method in which the electrodes are lowered to accommodate for the bow in the arc and the lower portion of the arc tube is flattened and thus brought closer to the arc, resulting in a lower difference in temperature between the upper and lower portions of the arc tube and an increased condensate surface area in the pool.

It is still yet another object of the present invention to provide a novel horizontally burning arc tube and method in which the electrodes are lowered to accommodate for the bow in the arc and the sides of the arc tube are brought closer to the arc, resulting in a more uniform arc tube wall temperature.

Another object of the present invention is to provide a novel horizontally burning metal halide arc tube and method with improved light output and color quality, and less Yet another object of the present invention is to provide a novel horizontally burning arc tube and method of increasing the temperature of the lamp at which condensation occurs.

Still other objects of the present invention are to provide novel methods of improving the performance of horizontally burning arc tubes and lamps.

Still further objects of the present invention are to provide novel horizontal burning arc tubes and novel methods of constructing them.

These and many other objects and advantages of the present invention will be apparent to one having skill in this art from the following detailed description of preferred embodiments when read in conjunction with the accompanying drawings.

THE DRAWINGS

FIG. 1 is an elevation and cross-sectional view of a prior art arc tube illustrating a cylindrical chamber with lowered electrodes.

FIG. 2 is an elevation and cross-sectional view of a prior art arc tube illustrating an asymmetrically pinched cylindrical chamber with lowered electrodes.

FIG. 3 is an elevation and cross-sectional view of a prior art arc tube illustrating a non-cylindrical, arc conforming arc tube with lowered electrodes.

FIG. 4 is an elevation and cross-sectional view of a prior art arc tube illustrating an asymmetrically pinched cylindrical chamber with lowered electrodes.

Figure 7:
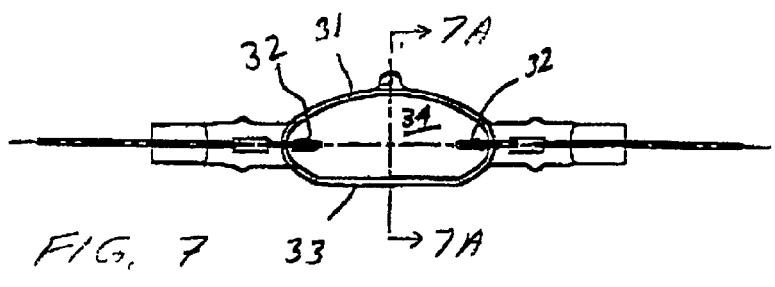

FIG. 5 is an elevation and cross-sectional view of a prior art arc tube illustrating a cylindrical chamber with a flattened bottom wall FIG. 6 is an elevation and cross-sectional view of a prior art arc tube illustrating a cylindrical chamber with lowered electrodes, FIG. 7 is an elevation and cross-sectional view of one embodiment of the arc tube of the present invention with a cylindrical top and a planar flattened bottom.

Figure 8:
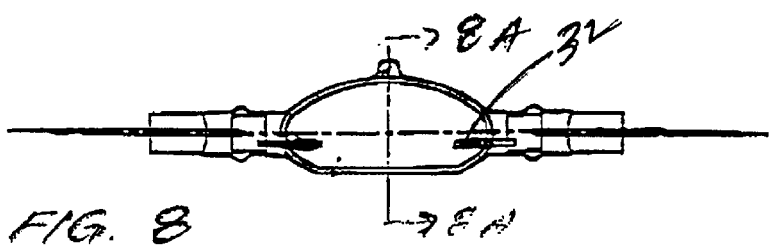
Figure 8A:
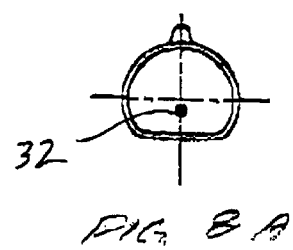

FIG. 8 is an elevation and cross-sectional view of another embodiment of the arc tube of the present invention with a cylindrical top and a planar flattened bottom and lowered electrodes.

Figure 9:
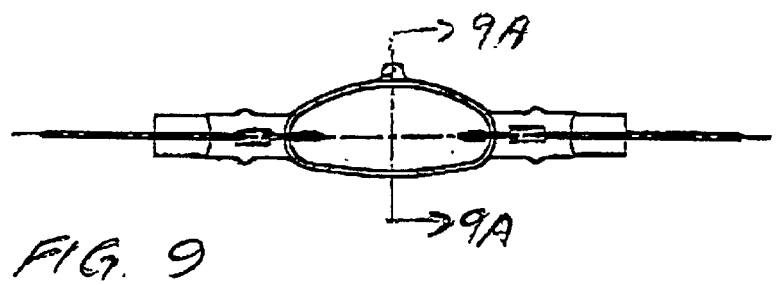
Figure 9A:
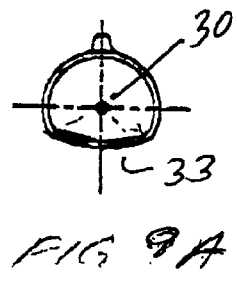

FIG. 9 is an elevation and cross-sectional view of another embodiment of the arc tube of the present invention with a cylindrical top and V-shaped flattened bottom.

Figure 10:
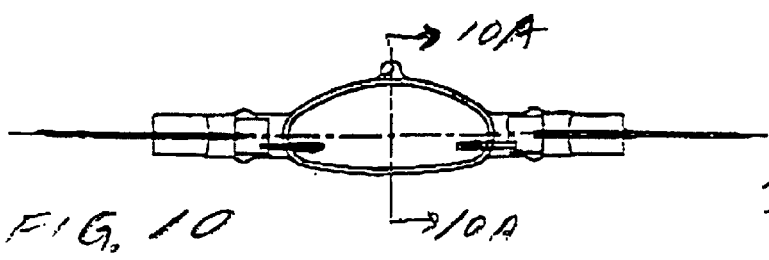

FIG. 10 is an elevation and cross-sectional view of another embodiment of the arc tube of he present invention with a cylindrical top and large radius bottom and lowered electrodes.

Figure 11:
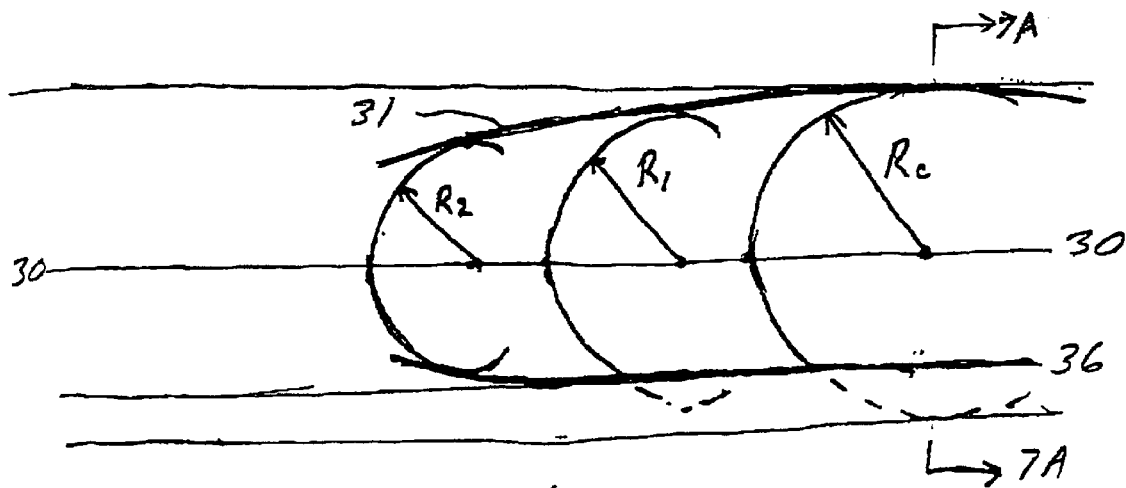

FIG. 11 is a schematic representation of the cross-section of a portion of an embodiment of the arc tube of the present invention illustrating the planar relationship of the bottom of the circles which define the top of the arc tube.

Figure 12:
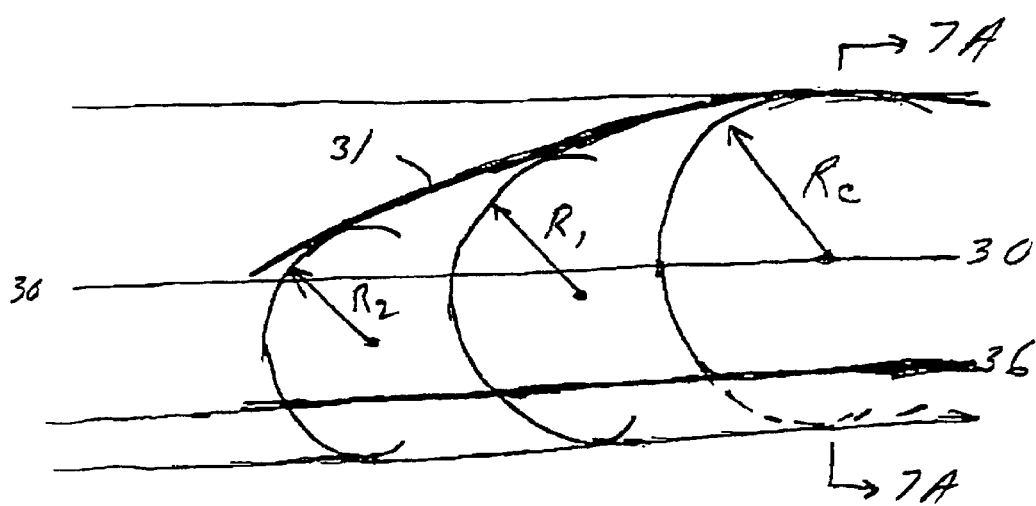

FIG. 12 is a schematic representation of the cross-section of a portion of an embodiment of an arc tube of the present invention illustrating a non-planar relationship the bottom of the circles which define the top of the arc tube.

Figure 13:
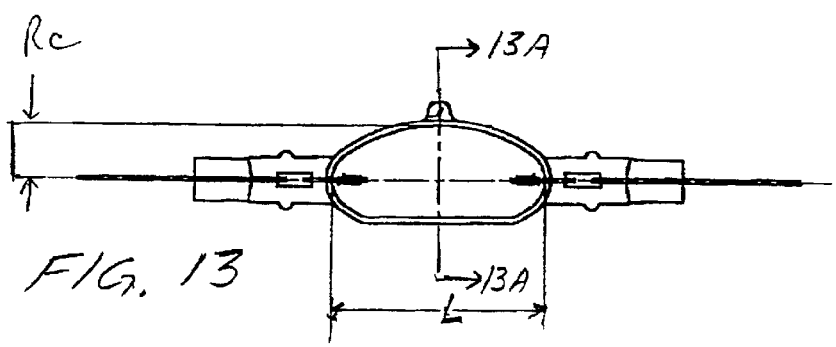
Figure 13A:
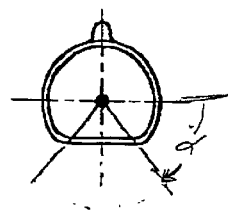

FIG. 13 is an elevation and cross-sectional view of an embodiment of an arc tube of the present invention illustrating the relationship of the diameter of the circle through the center of the arc tube to the length thereof and the arcuate portion of the circle which has been generally flattened.

FIG. 14 is an elevation and cross-sectional view of another embodiment of the arc tube of the present invention illustrating the narrowed sides with respect to axial electrodes and the arc subtended by the flattened portion.

Figure 15:

FIG. 15 is a top plan view of the arc tube of FIG. 14.

Figure 16:

FIG. 16 is a bottom view of the arc tube of FIG. 14 illustrating the shape of the flattened portion.

FIG. 17 is a top plan view of the arc tube of FIG. 14 illustrating the degree of narrowing at the elevation of the electrodes.

FIG. 18 is cross-sectional view of an arc tube illustrating one design in the narrowing thereof.

FIG. 19 is an elevation and cross-sectional view of another embodiment of the arc tube of the present invention illustrating the tilting of the electrodes in a narrow arc tube and the angle at the electrodes subtended by the flattened portion.

FIG. 20 is a bottom view of another embodiment of the arc tube of the present invention with tilted electrodes and a shallow v-shaped flattened portion.

FIG. 21 is a cross-sectional view of the arc tube of FIG. 20 illustrating the arcuate portions thereof.

Figure 22:
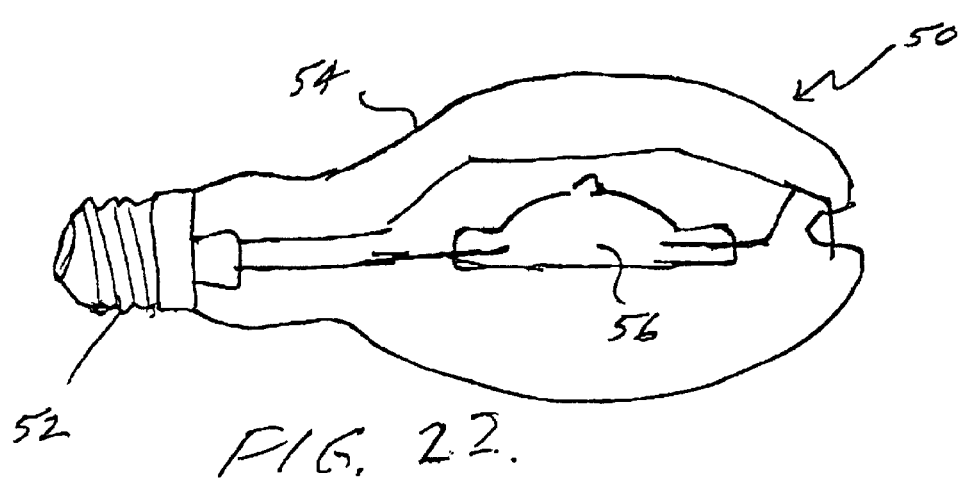

FIG. 22 is a pictorial representation of one embodiment of the horizontal burning HID lamp of the present invention.

FIGS. 23–26 are pictorial views illustrating the process of using a lathe and torch to make the arc tube of the present invention from a tube of vitreous material

DESCRIPTION OF PREFERRED EMBODIMENTS

Figure 7A:
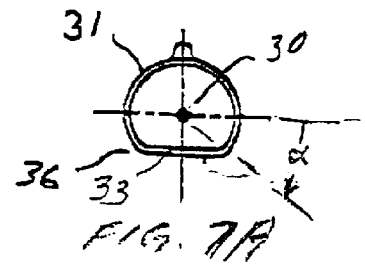

With reference now to the embodiment illustrated in FIGS. 7 and 7A, the arc tube of the present invention includes a light emitting chamber formed in any suitable conventional manner with a pair of spaced apart, coaxial electrodes extending through the closed ends thereof. The arc tube may be formed of quartz or a slip cast ceramic. In the embodiment of FIG. 7 the upper portion 31 of the arc tube in cross-section is preferentially the arc of a circle, i.e. a constant distance from the axis 30 of the electrodes 32. The cylindrical upper portion 31 of the arc tube continues downwardly for an angle α of between about 20 degrees and about 80 degrees below the horizontal on both sides, preferably between about 30 degrees and 60 degrees, where the arc joins the flattened bottom portion 33. As shown in FIG. 7, the loci 36 of the points of junction of the top portion and bottom portion form lines inclined to each other and to the axis 30 of the electrodes 32.

The cross-section of the chamber 34 is generally the same between the electrodes. i.e. the bottom is substantially planar between the electrodes, and the center of the circles which define the upper portion of the arc tube are coaxial with the electrodes. However as shown schematically in FIG. 11, the radius of the circles gradually decrease from the radius Rc at the center section of FIG. 7A through radii R1, R2, etc. to both ends of the chamber 34. This results in a continuing decrease in the cross-sectional area from the center of the chamber to the ends thereof as well as a slight decrease in the horizontal width of the flat bottom from the center of the chamber toward the ends thereof.

Alternatively as illustrated in FIG. 12, the radii of the circles defining the cross-section of the chamber 34 may decrease as shown in FIG. 11 but the centers may be lowered to place the lower tangent in the same horizontal plane. This increases the surface of the bottom of the chamber and steepens the decline of the top wall 31 from the center of the chamber to both ends.

In the embodiment of FIG. 8, the axis 30 of the electrodes 32 may be lowered relative to the axis of the circle defining the central cross-section of the chamber while maintaining a planar bottom between the electrodes.

In the embodiment of FIG. 9, the axis 30 of the electrodes may be coaxial with the axis of the circle defining the central cross-section and the bottom independently shaped to form a bottom 33 which is slightly v-shaped across the width of the chamber.

In the embodiment of FIG. 10, the axis 30 of the electrodes may be lowered with respect to the axis of the circle defining the central cross-section and bottom independently shaped to produce a bottom 33 which has a radius of curvature R which is large with respect to the radius Rc of the circle through the center of the upper portion of the chamber, preferably a ratio R/Rc between about 1.5 and about 5.0. Thus a slight downwardly convex curve is provided across the width of the chamber.

A slight v-shape or large radius curve may also be provided along the bottom portion of the chamber from end to end. The object in all embodiments is to provide an essentially flat bottom to the chamber to thereby increase the surface area of the halide pool and thus the vapor pressure of the halides in the arc. This bottom may be curved or v-shaped both longitudinally and/or transversely of the arc tube. Formed body arc tubes provide great manufacturing flexibility and may. e.g. be manufactured in the manner described in the Sulcs et al. copending patent application Ser. No. 09/470,156 filed Dec. 22, 1999 and entitled "Method of Making Optical Coupling Device" assigned to the assignee of the present invention, the disclosure of which is hereby incorporated herein by reference.

Figure 23:
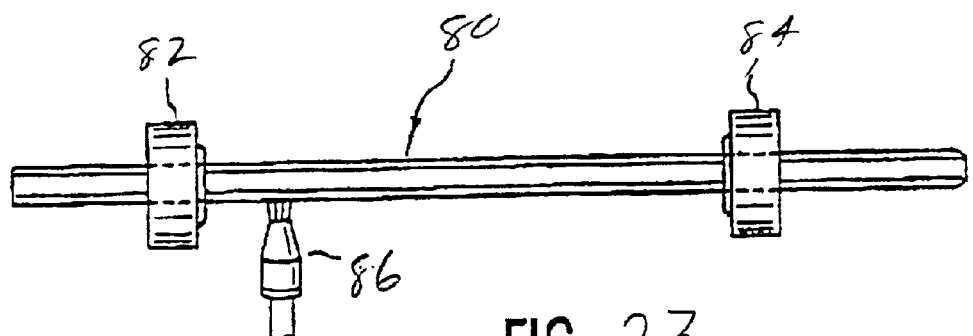

More specifically with reference to FIG. 23, a tube 80 of quartz or other vitreous material is shown held by an axially stationary holding device or headstock 82 and an axially moveable holding device or tailstock 84. The tube 80 may be heated in a conventional manner by one or more torches 86 near the stocks 82 and 84 to compensate for any longitudinal curvature in the tube 80 and to relieve the stress of griping by the tailstock 84.

Figure 24:
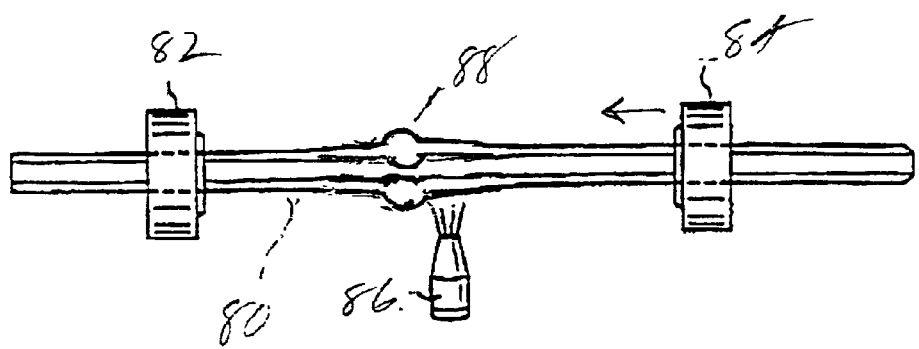
Figure 25:
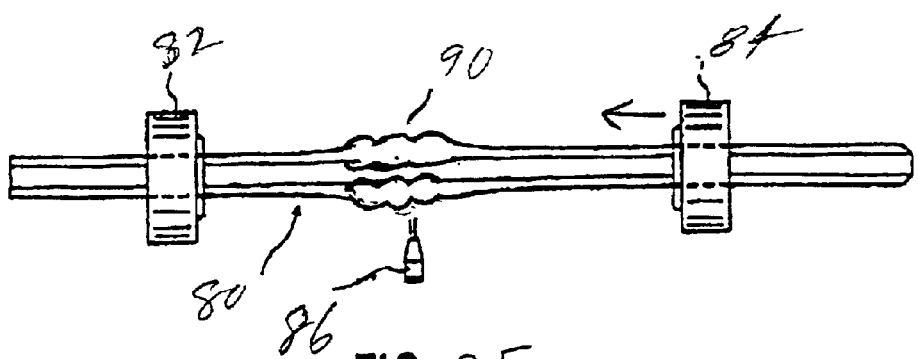
Figure 26:
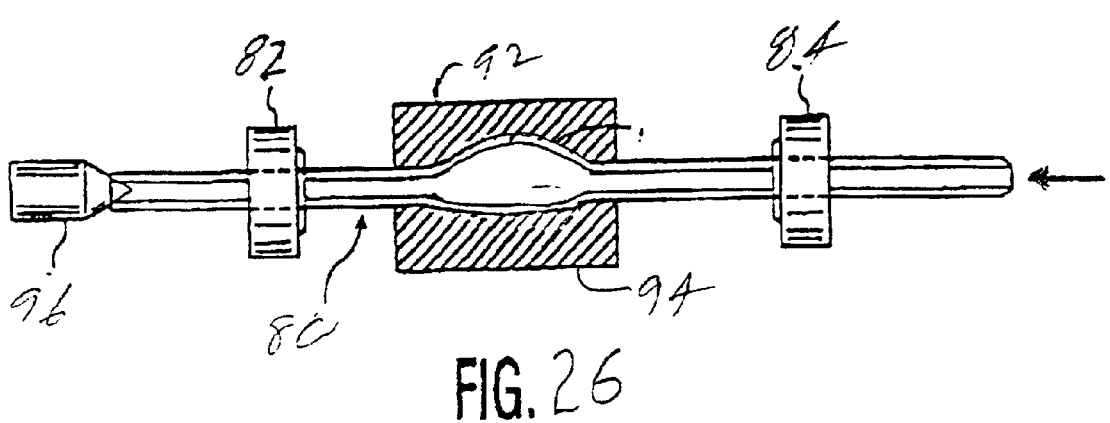

As illustrated in FIG. 24 where like elements have been accorded like numeric designations, the central section of the tube 80 may be heated by a torch 86 to soften the tube in the area where the chamber is to be formed. Movement of the tailstock 84 toward the headstock 82 will cause the softened tube to compress and the lateral displacement of the material forms a thicken wall area 88. As shown in FIG. 25, the steps of localized heating and axial movement of the tailstock are repeated until the wall of the tube 80 has been thickened over the entire area which is to become the arc tube chamber. Note that the thickening is carefully controlled relative to the diameter of the tube 80 so that a passageway remains through the tube 80 after the gathering process is completed.

The entire gathered area 90 may then be heated with a torch 86 to soften the material into a malleable state in which it can be molded. The two sides 92,94 of a mold may then be placed over the softened and thickened area 90 of the tube, one end of the tube sealed in a conventional manner by a plug 96, and a gas introduced into the other end of the tube from a suitable conventional source (not shown). The pressure of the gas internally of the thickened tube expands the outer walls against the mold, thinning the outer walls in the process, desirably to the approximate thickness of the tube as originally placed in the lathe. This results is the formation of an arc tube chamber having the shape The thickness of the wall may be controlled in the gathering process, i.e., it may be desirable to have the wall thicker or thinner than the wall thickness of the original tube. The thickness may also be influenced by the orientation of the mold because the softened glass tends to flow under the influence of gravity once the rotation of the tube is stopped for the placement of the mold thereover. As is well known, the heat absorption of the glass is a function of its thickness and it has been found desirable to split the mold horizontally rather than vertically. It has also been found that the softened glass tends to flow downwardly under the influence of gravity when rotation of the tube is stopped to position the mold with respect thereto. Thus the wall thickness may be slightly thicker on the lower side of the mold and it has been found desirable to position the mold bottom side uppermost in forming the arc tube.

One of the advantages of the present method of arc tube formation is that the arc tube may be made in symmetrical or asymmetrical shapes which are difficult to produce by pinch sealing of a cylindrical tube. In preferred embodiments, the bottom of the arc tube is between about 20 and about 80 percent of the length and width of the chamber, preferably between about 50 and about 60 percent of the length.

Another advantage is that a smaller diameter tube may be employed than would be required in the conventional pinching of a tube having the diameter of the chamber. The amount of material which must be pinched, and the amount of heat to elevate the temperature of that material may thus be significantly reduced. In a preferred embodiment, the tube is between about 5 mm and 7 mm in diameter and the maximum height of the mold cavity is between about 10 mm and about 30 mm.

This process of arc tube formation facilitates the formation of an arc tube chamber in which the electrodes may be lowered within the chamber to accommodate for the bow in the arc. By flattening the bottom of the arc tube, the distance from the bowed arc to the chamber wall is decreased, particularly in the area of the electrodes where the cold spots customarily form. The temperature of the chamber wall is made more uniform. In addition, the flattening of the bottom portion of the chamber increases the surface area of the halide pool for a given amount of halide, increases the exposure of the pool to the arc, and thus increases the vapor pressure of the halides in the chamber. The color quality and light output are thus improved.

By way of example, tests have indicated a twenty to thirty percent increase in the efficacy or lumens per watt of lamps employing the arc tube of the present invention with little sensitivity to slight tilting of the lamp from the horizontal.

Additional modifications may be made to the shape of the arc tube. With reference for example to FIG. 13, the ratio of the length L to the nominal height 2Rc, or aspect ratio, of the arc tube is between about 4 and about 1, preferably between about 3.0 and 1.5 with the angle α between the junction of the flattened bottom and the sides of the arc tube below the horizontal being between about 20 and about 80 degrees, preferably between about 30 and about 60 degrees.

As shown in the side view of FIG. 14 and the top view of FIG. 15, the chamber 60 may be narrowed as best seen in FIG. 14A bringing the side walls closer to the arc than would result from the formation of the arc tube from a tube cylindrical in cross-section. This narrowing may result in a ovate flat bottom as shown in FIG. 16 as the flat portion of the bottom also narrows from the center towards both ends of the arc tube.

Figure 10A:
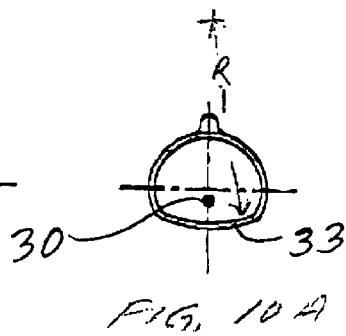

This narrowing may be achieved by effectively removing the center section D of the arc tube of FIG. 10A as is shown in FIG. 18. This retains the arcuate shape of the walls 62 of the arc tube, i.e., the circle radius R is maintained but the center of such arcs are displaced horizontally from the longitudinal center of the chamber.

As shown in FIG. 17, the side walls 64 are moved inwardly with respect to the position 66 thereof as shown in the arc tube of FIG. 7 a distance D2 which effects a reduction of the maximum width of the FIG. 7 embodiment at the longitudinal center thereof between about 5 percent and about 50 percent, preferably between about 10 and about 40 percent.

Where the arc tube progressively narrows longitudinally from the center to the ends thereof, combination with a flattened bottom is suggestive of the bottom of a canoe. As referenced herein, the term "canoe-shaped" includes flattened bottoms which are planar, and those which are either a shallow v-shape or arcuate from end-to-end and/or side-to-side.

A further embodiment is illustrated in FIG. 19 where the electrodes 68 are tilted downwardly toward the free ends thereof at an angle to the horizontal between about 5 and about 40 degrees, preferably between about 10 and about 20 degrees. This has the effect of further lowering the arc within the chamber 60 and makes the angle β at the free end of the electrodes 68 from the vertical to the junction 70 of the arcuate side walls and the flattened bottom between about 80 degrees and about 20 degrees, preferably between about 60 and about 30 degrees. As used herein, the term "tilted" includes both the angular attachment of a wire electrode and the axial attachment of an electrode which has been bent to the desired angle. Because the electrodes are typically made of tungsten and may be brittle, the electrodes may have to be heated prior to the bending.

As shown in FIG. 21, the distance D3 which the free ends of the electrodes 68 are lowered places the free ends of the electrodes between about 10 and about 50 percent, preferably between about 25 and about 33 percent, of the height of the chamber at the free ends of the electrodes.

The flattened bottom 72 of the arc tube may be arcuate as shown in FIG. 19 or slightly v-shaped as shown in the bottom view of FIG. 20 and the cross-sectional view of FIG. 21. The flattened bottom is desirably concave upwardly from end-to-end and from side-to-side which tends to keep the pool in the center of the chamber and thus reduces the susceptibility of the arc tube to minor changes in position relative to the horizontal.

As is well known, halides are substantially transparent to infra red radiation and absorbent of ultra violet radiation from the arc. The increased surface area of the halide pool increases the area of absorption and may increase the temperature of the condensate and thus the amount of halide in the arc.

As shown in FIG. 22, lamps 50 may include a conventional mogel base 52 and an outer envelope 54 in which a flat bottomed arc tube 56 may be mounted in any suitable conventional manner. Because the arc tube is rotationally fixed relative to the lamp base, and because the arc tube is operational only with the flat side down, it is desirable that the base be configured in any suitable conventional way to mate with the lamp fixture only in a predetermined manner which achieves that result.

While preferred embodiments of the invention have been illustrated and described in the foregoing written description, many modifications will be readily apparent to one of skill in this art without departing from the scope of the invention as defined by the appended claims.

What is claimed is:

1. A method of making an arc tube chamber intermediate tubular end portions comprising the steps of:
   (a) providing a tube of vitreous material;
   (b) heating a portion of the tube sufficiently to soften it in a predetermined area;
   (c) axially compressing the tube to force the softened material in the heated area radially inward and outward around the circumference of the tube to thereby thicken the tube wall in the heated area;
   (d) repeating step (b) and step (c) in areas of the tube proximate to the previously thickened tube wall at least one additional time to thereby thicken the wall of the tube over an axial distance approximating the length of the desired chamber;
   (e) heating the thickened wall area of the tube;
   (f) positioning a mold having a surface defining a chamber cavity of a desired shape over the heated thickened wall area, the chamber cavity defining surface having a portion for defining a canoe-shaped portion of the arc tube chamber;
   (g) internally pressurizing the tube to expand the heated thickened area of the tube against the internal wall of the mold cavity to thereby form a chamber in the tube; and
   (h) removing the mold from the chamber to thereby provide an arc tube chamber intermediate open tubular end portions.

2. The method of claim 1 wherein the ratio of the diameter of the tube to the maximum vertical height of the mold cavity is between about 7/10 and about 7/30 to thereby reduce the amount of heat required to seal the end portion by pinch seal.

3. The method of claim 1 wherein the ratio of the diameter of the tube to the maximum horizontal width of the mold cavity is between about 7/10 and about 7/30 to thereby reduce the amount of heat required to seal the end portion by pinch seal.

4. The method of claim 1 wherein the ratio of the maximum vertical height of the mold cavity to the maximum horizontal width of mold cavity is approximately one.

5. The method of claim 1 wherein the two longitudinal halves of the mold cavity are symmetrical.

6. The method of claim 1 wherein the mold cavity is symmetrical in vertical cross-section throughout the length thereof.

7. The method of claim 1 wherein the tube is positioned so that its axis is substantially horizontal and the mold cavity is positioned with the canoe-shaped portion defining surface up in step (f).

8. The method of claim 1 wherein the mold cavity is horizontally split for positioning in step (f).

9. The method of claim 8 wherein the mold cavity is positioned with the canoe-shaped portion defining surface up in step (f).

10. The method of claim 1 wherein the canoe-shaped portion defining surface of the mold is flattened in an area between about 20 and about 80 percent of the maximum width of the mold cavity.

11. The method of claim 1 wherein the canoe-shaped portion defining surface of the mold is flattened in an area between about 20 and about 80 percent of the maximum length of the mold cavity.

12. The method of claim 11 wherein the canoe-shaped portion defining surface of the mold is flattened over a distance between about 50 and about 60 percent of the maximum length of the mold cavity.

13. The method of claim 1 wherein a portion of the mold cavity opposite the canoe-shaped portion defining surface is arched.

14. The method of claim 1 wherein the mold cavity is widest at the longitudinal center of the cavity and progressively more narrow towards the ends of the chamber.

15. The method of claim 1 wherein the mold cavity is tallest at the longitudinal center of the cavity and progressively more narrow towards the ends of the chamber.

16. The method of claim 1 comprising the further steps of:
  (i) positioning an in lead connector, foil and electrode assembly within each open tubular ends;
  (j) heating the open tubular ends; and
  (k) pinch sealing the open tubular ends over a portion of the assembly to thereby form an arc tube.

17. The method of claim 1 wherein the lateral cross-section of the cavity at its widest point includes a generally circular portion and a generally straight portion, the circular portion comprising an arc of between about 220 degrees and about 340 degrees.

18. The method of claim 17 wherein the circular portion comprises an arc of between about 240 degrees and 300 degrees.

19. A mold for forming a bulbous arc tube chamber intermediate tubular end portions in a formed body arc tube, said mold defining a cavity having a flattened portion extending over 50% or more of the maximum length of the cavity.

20. The method of claim 19 wherein said mold defines a cavity having a flattened portion extending between about 50% and about 80% of the maximum length of the cavity.

21. A method of making an arc tube chamber intermediate tubular end portions comprising the steps of:
  (a) providing a tube of vitreous material;
  (b) heating a portion of the tube sufficiently to soften it in a predetermined area;
  (c) axially compressing the tube to force the softened material in the heated area radially inward and outward around the circumference of the tube to thereby thicken the tube wall in the heated area;
  (d) repeating step (b) and step (c) in areas of the tube proximate to the previously thickened tube wall at least one additional time to thereby thicken the wall of the tube over an axial distance approximating the length of the desired chamber;
  (e) heating the thickened wall area of the tube;
  (f) positioning a mold having an elongated chamber cavity over the heated thickened wall area, the chamber cavity having a flattened portion extending between about 50% and about 80% of the maximum length of the cavity;
  (g) internally pressurizing the tube to expand the heated thickened area of the tube against the internal wall of the mold cavity to thereby form a chamber in the tube; and
  (h) removing the mold from the chamber to thereby provide an arc tube chamber intermediate open tubular end portions.

22. The method of claim 21 wherein the chamber cavity is symmetrical in at least one longitudinal cross-section.

23. The method of claim 22 wherein a symmetrical cross-section is perpendicular to an asymmetrical cross-section.

24. The method of claim 21 wherein the flattened portion of said mold cavity is positioned in the uppermost area of said mold cavity.

25. The method of claim 21 wherein the flattened portion of said mold cavity is positioned in the lowermost area of said mold cavity.

26. The method of claim 21 wherein the mold is split in two portions.

27. The method of claim 26 wherein only one portion of the mold defines the flattened portion of the mold cavity.

28. A mold for forming an elongated bulbous chamber intermediate tubular end portions in an arc tube, said mold having a surface defining a cavity for molding a canoe-shaped portion of the chamber.

29. The mold of claim 28, being symmetrical in at least one longitudinal cross-section.

30. The mold of claim 29 wherein a symmetrical longitudinal cross-section is perpendicular to an asymmetrical longitudinal cross-section.

31. The mold of claim 28 wherein said surface includes a flattened portion.

32. The method of claim 31 wherein the flattened portion is slightly v-shaped across the width of the cavity.

33. The mold of claim 28 wherein the flattened portion is slightly arcuate across the width of the cavity.

34. A method of making an arc tube having a bulbous chamber disposed between tubular end portions comprising the steps of:
  providing a tube of vitreous material; and
  forming a bulbous chamber in the tube having a lateral cross-section at the central portion thereof formed by first and second circular portions, the ratio the radius of curvature of the first portion to the radius of curvature of the second portion being between about 1.5 and about 5.

35. A method of making an arc tube having a bulbous chamber disposed between tubular end portions comprising the steps of:
  providing a tube of vitreous material; and
  forming a bulbous chamber in the tube having a lateral cross-section at the central portion thereof formed by a circular arc of between about 220 degrees and 340 degrees and a non-curved portion.

36. The method of claim 35, wherein the non-curved portion is slightly v-shaped.

37. A method of making a horizontally burning HID arc tube comprising the steps of:
  providing a tube of vitreous material; and
  forming a light emitting chamber in said tube having an upper portion longitudinally conforming generally to the shape of the arc to be drawn in the chamber and a canoe-shaped lower portion.

38. A method of making an arc tube for a horizontally burning HID arc tube comprising the steps of:
  (a) providing a tube of vitreous material;
  (b) heating a portion of the tube sufficiently to soften it in a predetermined area;
  (c) axially compressing the tube to force the softened material in the heated area radially inward and outward around the circumference of the tube to thereby thicken the tube wall in the heated area;

(d) repeating step (b) and step (c) in areas of the tube proximate to the previously thickened tube wall at least one additional time to thereby thicken the wall of the tube over an axial distance approximating the length of the desired chamber, (e) heating the thickened wall area of the tube;

(f) positioning a mold having a surface defining a cavity for molding a chamber having a portion longitudinally conforming generally to the shape of the arc to be drawn in the chamber opposite of a canoe-shaped portion;

(g) internally pressurizing the tube to expand the heated thickened area of the tube against the internal wall of the mold cavity to thereby form a chamber in the tube; and (h) removing the mold from the chamber to thereby provide an arc tube chamber intermediate open tubular end portions.

39. A method of making an arc tube for an HID lamp comprising the steps of:

providing a tube of vitreous material; and forming a bulbous chamber intermediate the end portions of the tube, the chamber having a flattened portion extending over 50% or more of the maximum length of the chamber.

40. The method of claim 39 wherein the flattened portion extends between about 50% and about 80% of the maximum length of the chamber.

* * * * *